United States Patent [19]

Berchowitz

[11] Patent Number: 5,003,777

[45] Date of Patent: Apr. 2, 1991

[54] ASYMMETRIC GAS SPRING

[75] Inventor: David M. Berchowitz, Athens, Ohio

[73] Assignee: Sunpower, Inc., Athens, Ohio

[21] Appl. No.: 544,196

[22] Filed: Jun. 25, 1990

[51] Int. Cl.⁵ ............................................. F02G 1/045
[52] U.S. Cl. ...................................................... 60/520
[58] Field of Search .......................................... 60/520

[56] References Cited

U.S. PATENT DOCUMENTS

| | | | |
|---|---|---|---|
| 4,215,548 | 8/1980 | Beremand | 60/520 |
| 4,922,722 | 5/1990 | Kazumoto et al. | 60/520 X |
| 4,945,726 | 8/1990 | Beale | 60/520 |

Primary Examiner—Allen M. Ostrager
Attorney, Agent, or Firm—Frank H. Foster

[57] ABSTRACT

In a free piston Stirling machine, a gas spring apparatus for applying two distinctly different spring rates to the displacer during the displacer's excursion past a center point in opposite ends of the work space. The apparatus comprises a cylinder formed in a gas spring housing, in which a gas spring piston is slidably mounted. On opposite sides of the gas spring piston there are two unequal volume gas spring chambers. Between the gas spring chambers there is a bleed hole which divides the cylinder into the two chambers and allows communication between the gas spring chambers and a gas reservoir. While the piston is compressing one gas spring chamber, the opposite is in communication with the gas reservoir and vise versa. This creates two distinctly different spring rates applied to the displacer. The two different forces increase and decrease the acceleration of the displacer which creates a more efficient sweeping of the working gas between the hot and cold space, thereby increasing the efficiency and work of the machine.

10 Claims, 2 Drawing Sheets

TO BOUNCE SPACE

ASYMMETRIC GAS SPRING

TECHNICAL FIELD

This invention relates to the field of free piston Stirling cycle machines and more specifically to a spring apparatus used to apply a force to the displacer piston.

BACKGROUND ART

Conventional free piston Stirling machines have a displacer piston and a power piston which reciprocate in a cylinder formed within a housing. At one end of the power piston there is a work space and at the opposite end, a back space. The displacer piston reciprocates in the work space and is connected to a spring apparatus which applies a force to the displacer piston. In conventional free piston Stirling machines, gas or mechanical springs are connected to the displacer piston either by a rod which slides through the power piston or by being formed within the displacer and acted upon by a rod fixed to the housing and extending through the piston.

A single chamber gas spring is the most commonly used spring apparatus. While fulfilling the basic spring function of periodically storing as potential energy the energy transferred to it by the kinetic energy of the moving displacer, the single chamber gas spring has a number of disadvantages. With the single chamber gas spring, hysteresis losses can be significant if high spring rates, that is large pressure variations, are required (such as in a high frequency, low pressure Stirling engine). Furthermore the seal length, the length of the region where the gas spring piston slides in the gas spring chamber walls, varies over the path of reciprocation of the gas spring piston. This variation in seal length could lead to unequal volume gas leaks into and out of the spring chamber, thereby causing the displacer piston to creep from its center position.

A graph of working gas pressure versus working gas volume from a machine using the single chamber gas spring is generally elliptical. The area within the graph (the ellipse) represents the amount of work produced by the machine. Since it is desirable to increase the amount of work a machine produces, it is desirable to increase the area within the graph. With the single chamber gas spring, the area within the graph is limited to being generally symmetric, such as an ellipse, because of the symmetric behavior of the gas spring. By the symmetric behavior of the spring it is meant that the force exerted by the spring when the displacer is at any point in the displacer's path, is similar to the force exerted by the spring when the displacer is at a point an equal distance from the center position of the displacer, but on the opposite side of the center.

While the conventional, single chamber gas spring has found the widest use, its many disadvantages demonstrate the need for an improved gas spring apparatus. Therefore, the need is created for a gas spring apparatus which shows low hysteresis losses, has a constant seal length to prevent piston creep and increases the amount of work produced by the Stirling engine.

BRIEF DISCLOSURE OF INVENTION

This invention relates to free piston Stirling machines in which a displacer piston is slidably mounted in a cylinder formed in a housing. A gas spring applies a force to the displacer piston, and the improvement is in the gas spring apparatus. The improved gas spring apparatus comprises a gas spring cylinder wall formed in a gas spring housing. This gas spring cylinder wall is divided, by a gas spring piston which is slidably mounted within the gas spring cylinder wall, into two gas chambers, a large volume chamber and a small volume chamber. At least one bleed hole is formed in the gas spring cylinder wall at the center of the reciprocal path of the gas spring piston. The improved gas spring apparatus is for applying a force on the displacer piston which is a function of one spring constant when the gas spring piston is in the large chamber and a function of a higher spring constant when the gas spring piston is in the smaller chamber with no force applied to the displacer piston while the gas spring piston crosses the bleed hole.

Figure 1:
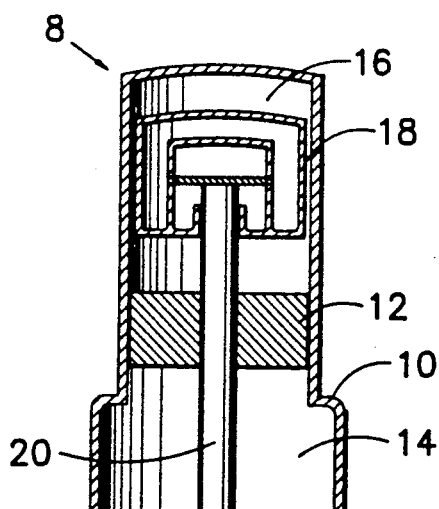
FIG. 1 shows a view in cross-section of a conventional free piston Stirling machine with the preferred embodiment of the present invention.

In describing the preferred embodiment of the invention which is illustrated in the drawings, specific terminology will be resorted to for the sake of clarity. However, it is not intended that the invention be limited to the specific terms so selected and it is to be understood that each specific term includes all technical equivalents which operate in a similar manner to accomplish a similar purpose.

DETAILED DESCRIPTION

FIG. 1 gives an illustration of the preferred embodiment of the present invention used in an otherwise conventional free piston Stirling engine 8. The free piston Stirling engine 8 is made up of a cylinder formed in a housing 10 with a piston 12 reciprocating within the housing 10. At one end of the piston 12 there is a back space 14 and at the opposite end, a work space 16. A displacer 18 reciprocates within the work space 16. A rod 20 attaches to the housing 10 and extends through the piston 12 into the displacer 18. The present invention, which is an asymmetric gas spring, is housed, in the preferred embodiment, within the displacer 18 and is shown in cross-section in FIG. 1.

Figure 2:
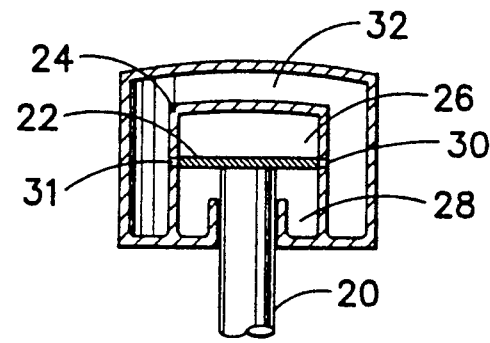
FIG. 2 illustrates a more detailed cross-sectional view in perspective of the preferred embodiment of the present invention.

FIG. 2 illustrates only the preferred embodiment of the present invention of FIG. 1 in cross-section. The gas spring apparatus which, in the preferred embodiment is housed within the displacer 18, comprises a gas spring piston 22, which is slidably mounted within a gas spring cylinder formed within a housing 24. A pair of bleed holes 30 and 31 are located in the gas spring cylindrical housing 24 at the center of the gas spring piston's 22 path of reciprocation. The bleed holes 30 and 31 divide the gas spring cylindrical housing 24 into a relatively smaller volume gas spring chamber 26 and a relatively larger volume gas spring chamber 28. By relatively larger and smaller chambers it is meant that one chamber is larger relative to the other chamber, and the other chamber is smaller relative to the first chamber. Any number of bleed holes more than one will provide the desired function of the bleed hole, but in the preferred embodiment, a pair of oppositely aligned bleed holes 30 and 31 are used.

The bleed holes 30 and 31 allow passage of gas between the gas spring cylindrical housing 24 and a gas reservoir 32. The gas reservoir 32 may be either the interior of the displacer as shown in FIG. 2, or the gas reservoir 32 may be any suitably large bounce space, such as the back space 14 of the Stirling machine of FIG. 1. By a gas reservoir it is meant that the word "reservoir" take the conventional meaning, which is that a system, such as a gas chamber, placed in communication with the reservoir tends to negligibly affect the reservoir while coming to an equivalent state with the reservoir. The rod 20 is attached to the gas spring piston 22 and, as shown in FIG. 1, is rigidly attached to the Stirling machine housing.

The operation of the preferred embodiment illustrated in FIG. 2, is as follows. The displacer 18 reciprocates in the conventional manner. As the displacer 18 reciprocates, its motion relative to the gas spring piston 22 causes the gas within the gas spring cylindrical housing 24 to become compressed. This compressed gas within the housing 24, has potential energy, just as a compressed mechanical spring has potential energy. This compressed gas exerts a force on both the gas spring cylindrical housing 24 and the gas spring piston 22. The force of the compressed gas on the gas spring cylindrical housing 24 is one of the forces which maintains the reciprocation of the displacer 18.

With the gas spring piston 22 located at the position illustrated in FIG. 2 relative to the bleed holes 30 and 31, the displacer 18 may travel in one direction or the other. For example, as the displacer 18 travels downward in FIG. 2, the gas spring piston 22 appears to travel upward, although it is rigidly attached to the engine housing via the rod 20, and compress the gas within the small volume gas spring chamber 26. As the gas spring piston 22 passes the lower edges of the bleed holes 30 and 31, opening the bleed holes 30 and 31, the gas within the large volume gas spring chamber 28 is able to communicate with the gas in the gas reservoir 32 through the bleed holes 30 and 31. This communication causes the gas in the large volume gas spring chamber 28 to have virtually no effect on the gas spring piston 22. The gas spring piston 22 continues to compress the gas in the small volume gas spring chamber 26 until it reaches its point of maximum compression. This occurs as the displacer 18 reaches its downward most position in its path of reciprocation.

The displacer 18 then begins to travel upward, expanding the gas within the small volume gas spring chamber 26. When the gas spring piston 22 reaches the lower edges of the bleed holes 30 and 31, the pressure of the gas between the gas reservoir 32, the large volume gas spring chamber 28 and the small volume gas spring chamber 26 is equal. No pressure force is encountered by the gas spring piston 22 from the gas in the gas spring cylindrical housing 24 until the upper edge of the gas spring piston 22 passes beyond the upper edges of the bleed holes 30 and 31. It is at this point that the gas spring piston 22 begins to compress the gas within the large volume gas spring chamber 28. Once the gas spring piston 22 passes beyond the upper edges of the bleed holes 30 and 31, the gas in the small volume gas spring chamber 26 is able to communicate with the gas reservoir 32 through the bleed holes 30 and 31. A spring force is then applied to the displacer 18 by the pressurized gas in the large volume gas spring chamber 28. This spring stiffness, however, is less than the spring stiffness encountered by the pressurized gas within the small volume gas spring chamber 26. This is due to the larger volume and thus the lower spring constant of the large volume gas spring chamber 28.

The displacer 18 continues upward, and the gas spring piston 22 appears to travel downward, until the displacer 18 reaches the maximum upward displacement in its path of reciprocation, at which point it begins moving downwardly again. The cycle continues this way with the displacer 18 encountering two distinctly different spring stiffnesses due to the two distinctly different spring constants which in turn result from the two unequal volumes of the gas spring chambers 26 and 28.

Figure 3:
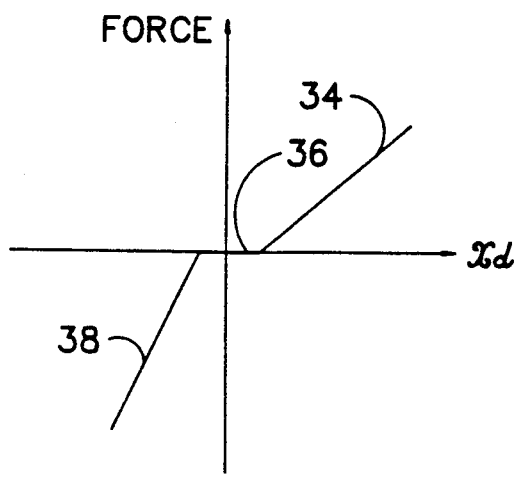
FIG. 3 illustrates a plot of force applied to the displacer versus displacement of the displacer.

The description of the operation of the preferred embodiment illustrated in FIG. 2 can be enhanced by the graph of FIG. 3. This graph shows a plot of force applied to the displacer by the gas spring apparatus versus displacement of the displacer. The three distinctly different lines shown on the graph represent the three distinctly different spring characteristics of the present invention.

The portion 34 of the graph of FIG. 3 represents the force applied to the displacer by the gas spring apparatus when the displacer is positioned past the bleed holes and compresses the larger volume gas spring chamber. Portion 34 has a lower slope than a corresponding portion of the graph on the opposite side of the center position ($X_d=0$). As the displacer compresses the gas within the large volume gas spring chamber, it encounters a generally linearly increasing spring force. The rate of change of force relative to the rate of change of displacement is the spring constant k ($dF/dx=k$).

Zero displacement from the center point, and a small displacement in either direction, on the graph is illustrated as having zero force and is shown by portion 36 in the graph of FIG. 3. When the gas spring piston of FIG. 2 is directly over the bleed holes, it is centered pneumatically and this corresponds to zero displacement from the center point of the graph shown in FIG. 3. Portion 36 illustrates the absence of a spring force applied to the displacer when the gas spring piston is centered. The absence of the spring force on the displacer occurs because of the tendency of the gas pressure to equalize between the large and small volume gas spring chambers and the gas reservoir when the gas spring piston is directly over the bleed holes.

As the displacement continues leftward on the graph of FIG. 3, a spring force illustrated by the portion 38 is then encountered. This spring force begins as the gas spring piston begins to compress the gas within the small volume gas chamber. The slope of the portion 38 is greater than that of the portion 34 which is due to the higher spring constant of the smaller volume gas spring chamber.

The advantage to the dual spring characteristic of this asymmetric gas spring is that it is desirable to increase and decrease the acceleration of the displacer at different locations within its path of reciprocation. For example, as the displacer is travelling toward the work space, that is toward the heated end of the Stirling engine, it is desirable to increase its acceleration so that it can more quickly displace the heated gas in that area. By increasing the rate of displacement of the heated gas, the gas is more quickly forced into the cooled area of the work space, the gas spends more time in the cooled region and therefore cools to a greater extend, thus causing the machine to operate more efficiently. Additionally, as the displacer has displaced the heated gas and forced it toward the cooled end of the Stirling engine, it is desirable to maintain its position at the upper end of the Stirling engine for a long period of time. It is at this location that a weaker spring is desirable since a weaker spring will allow the position of the displacer to be maintained for a greater period of time.

By varying the location of the bleed holes 30 and 31 shown in FIG. 2, it is possible to vary the location where the spring constant of the spring apparatus changes from higher to lower and vice versa. This is due to the fact that it is at the bleed holes 30 and 31 of FIG. 2 that the gas spring piston 22 begins compression of a different chamber while eliminating any effect of the opposite chamber. Therefore it is at the bleed holes that the spring constant changes.

Figure 4:
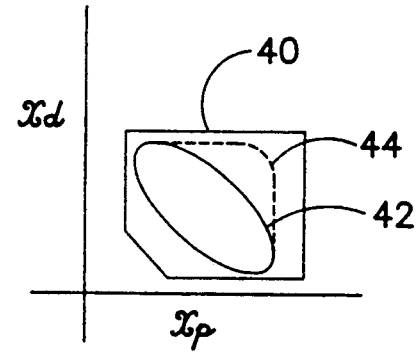
FIG. 4 is a graphical illustration of the displacer piston displacement versus the power piston displacement.

As shown in the graph of FIG. 4, which is a plot of displacer displacement versus piston displacement, there are three paths of concern with the present invention. The path 40 is that which results from an ideal machine which has, for example, no frictional losses. This machine would give maximum power and is merely an impractical idealized cycle used for analysis of the theoretical Stirling cycle. Path 42, which is generally elliptical in shape, shows the results obtained by a machine using a conventional single chamber gas spring. The single chamber gas spring machine is limited to an elliptical shape because of the approximately constant spring rate characteristics of the single chamber gas spring.

The path 44 is the result of a machine using the present invention. This path 44 has an increased area over the path 42 of the single chamber gas spring machine. The area of the graph shown as a hyphenated path is the improvement discovered over a single chamber gas spring when using the present invention. This hyphenated line occurs because of the greater acceleration of the displacer relative to the displacement of the piston. This occurs when the displacer encounters the high spring force in the portion of its cycle that it is past its center and begins travelling toward the heated end of the Stirling machine. This value of $X_d$ is maintained generally constant at its maximum due to the displacer encountering the weak spring force once the displacer passes its center position. The remainder of the path 44 is generally the same as the path 42.

Figure 5:
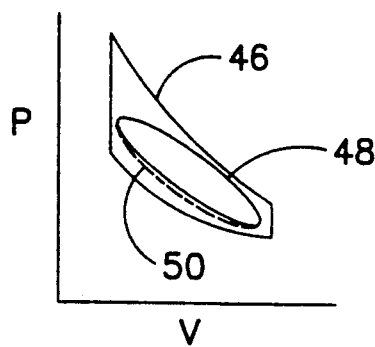
FIG. 5 illustrates a graph of pressure versus volume.

FIG. 5 is a plot of pressure versus volume. The graph of FIG. 5 is similar to the graph of FIG. 4 in that it has an ideal path 46, a path 48 which is the result of a machine using a single chamber gas spring, and a path 50 which is the result of a machine using the present invention. Additionally, the graph of FIG. 5 corresponds with the graph of FIG. 4 in such a way that an increase in the area of the graph of FIG. 4 will result in an increase in the area of the graph of FIG. 5. The area of a graph of pressure versus volume of any machine is equal to the work produced by that machine. Therefore, by creating a machine which has a larger area in its pressure versus volume graph than a previous machine, the new machine will produce more work than the previous machine. Since the two graphs of FIG. 4 and FIG. 5 correspond as stated, increasing the area of the graph of FIG. 4 will proportionally increase the area of the graph of FIG. 5.

Thus, it can be seen that by causing the displacer to move more rapidly relative to the piston in a portion of its reciprocation cycle, the area of the graph of FIG. 4 is increased, thus increasing the area of the graph of FIG. 5 and increasing the work produced by the machine. From this it is evident that the present invention increases the work produced by a Stirling machine.

The present invention utilizes alternate spring forces acting on the displacer at different points in the path of reciprocation of the displacer. Because of the difference in spring forces, the acceleration of the displacer is also different at different points in the path of reciprocation of the displacer. By increasing the acceleration of the displacer at selected points in the displacer's path of reciprocation, the displacer is made to more quickly sweep the working gas from one end of the work space to the other. This quicker sweeping of the working gas aids in the driving efficiency of the piston by increasing the extent to which the working gas is heated and cooled. This causes the overall work output of the Stirling machine to increase.

Figure 6:
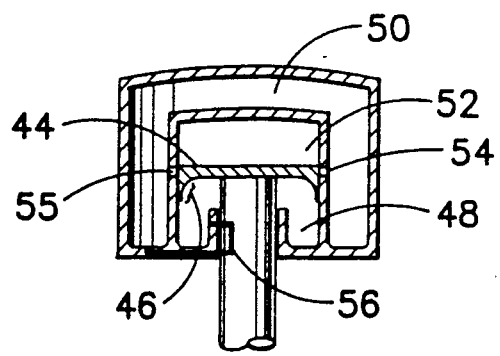
FIG. 6 provides a view in perspective of an alternative embodiment.

FIG. 6 illustrates an alternative embodiment of the present invention. This embodiment is similar to the preferred embodiment but with a piston wall 46 extending down from the piston 44. This extended piston wall 46 seals the larger volume gas spring chamber 48 from communicating with a gas reservoir 50. Stated differently, in the preferred embodiment, a gas spring chamber communicated with the gas reservoir during the gas spring piston's compression of the opposite chamber. But, communication with the gas reservoir 50 in FIG. 8 occurs only when the larger chamber 48 is compressed. When the smaller gas spring chamber 52 is compressed, the piston wall 46 covers bleed holes 54 and 55 and effectively creates a two chamber spring. This two chamber spring is made of a compressed gas chamber 52 and an expanded gas chamber 48. The smaller volume chamber 52 applies a compressive force to the gas spring piston 44 and the larger volume chamber 48 applies a tensile force to the gas spring piston 44. This embodiment effectively creates a much higher spring constant during compression of the smaller chamber 52, with a similar spring stiffness as in the preferred embodiment during compression of the larger chamber 48. This alternative embodiment would need a center porting device 56 which would equalize the gas pressure between the large volume gas spring chamber 48 and the gas reservoir 50. Center ports are conventionally used to provide a mechanically fixed centering location.

Figure 7:
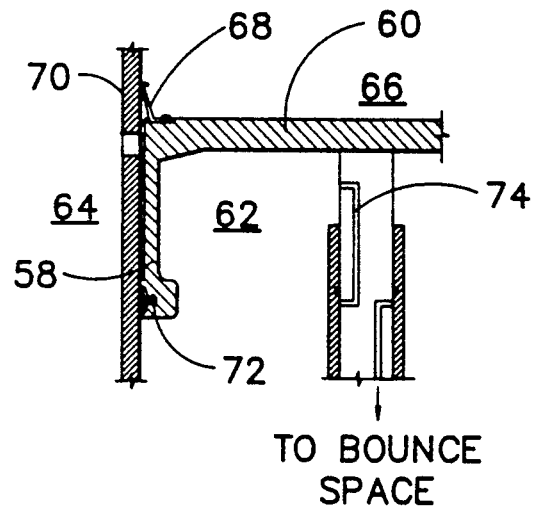
FIG. 7 illustrates a view in perspective of an alternative embodiment.

FIG. 7 illustrates another alternative embodiment comprising a similar structure to that illustrated in FIG. 6. The embodiment of FIG. 7 also has piston wall extension 58 which extends downward from a gas spring piston 60 and effectively seals a larger volume gas spring chamber 62 from communicating with either a gas reservoir 64 or a smaller volume gas spring chamber 66. A pressure activated gas sealing spring 68 is mounted circumferentially on the outer edge of the gas spring piston 60. This gas sealing spring 68 extends toward and contacts the housing 70 when there is a larger pressure in the small volume gas spring chamber 66 than in its surroundings. A similar sealing spring device 72 is located on the lower portion of the piston extension 58 which seals the large volume gas spring chamber 62 from communicating with its surrounding when a difference in pressure, which can be either greater or less than that in the small volume gas spring chamber 66, is encountered. A center port device 74, which is conventionally used on free piston Stirling machines, is part of this embodiment for providing a mechanically fixed center location.

Figure 8:
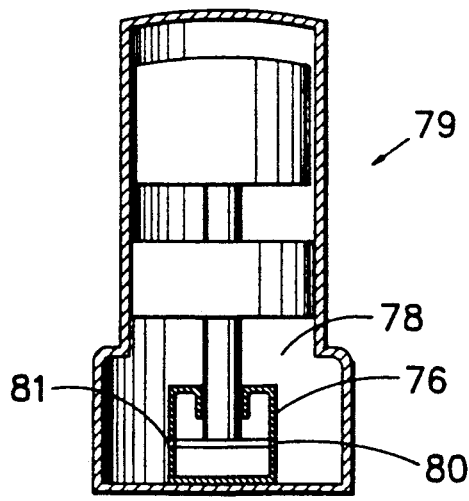
FIG. 8 illustrates a view in perspective of an alternative embodiment of the present invention.

FIG. 8 illustrates an alternative location of a gas spring apparatus 76. The gas spring apparatus 76 may be located in a backspace 78 of a free piston Stirling engine 79. With this location it is also possible that the backspace 78 would serve as a gas reservoir in communication via bleed holes 80 and 81 with the gas spring chambers of the gas spring apparatus 76. This would eliminate the need to manufacture the gas spring housing within the displacer.

While certain preferred embodiments of the present invention have been disclosed in detail, it is to be understood that various modifications may be adopted without following claims.

I claim:

1. In a free piston Stirling machine in which a force is applied by a gas spring to a displacer piston, a method of increasing the work produced by the machine comprising applying a spring force of high spring constant during one portion of the machine's cycle to increase the acceleration of the displacer piston and a force of lower spring constant during the remaining portion of the machine's cycle to decrease the acceleration of the displacer piston.

2. In a free piston Stirling machine in which a displacer piston is slidably mounted in a cylinder formed in a housing and a gas spring applies a force to the displacer piston, an improved gas spring comprising a gas spring cylinder wall formed in a gas spring housing, a gas spring piston which is slidably mounted within the gas spring cylinder wall, and having at least one bleed hole formed in the gas spring cylinder wall at the center of the path of reciprocation of the gas spring piston which allows communication between the gas spring cylinder and a gas reservoir, and divides the gas spring cylinder wall into a pair of unequal volume gas spring chambers, a relatively smaller chamber and a relatively larger chamber, the gas spring applying a force on the displacer piston which is a function of one spring constant when the gas spring piston is in the larger chamber, a force on the displacer piston which is a function of a higher spring constant when the gas spring piston is in the smaller chamber and no force on the displacer piston while the gas spring piston crosses the bleed hole.

3. The gas spring apparatus in accordance with claim 2 wherein the higher spring force of the smaller chamber is applied to the displacer piston when the displacer piston is located in the section of the cylinder past a center position of its path of reciprocation closest to a back space, and the lower spring force of the large chamber is applied to the displacer piston when it is located in the section of the cylinder past the center position of its path of reciprocation opposite the back space.

4. The gas spring apparatus in accordance with claim 2 wherein the bleed hole is located in the wall of the cylindrical gas spring housing between the gas spring chambers for allowing the gas in one gas spring chamber to communicate with the gas reservoir when the gas spring piston is located past said bleed hole, within the other gas spring chamber.

5. The gas spring apparatus in accordance with claim 4 wherein the gas reservoir comprises the back space of the Stirling machine.

6. The gas spring apparatus in accordance with claim 4 wherein the gas reservoir comprises the hollow interior of the displacer piston.

7. The gas spring apparatus in accordance with claim 2 or 4 wherein the bleed hole comprises a plurality of through holes spaced circumferentially around the wall of the cylindrical gas spring housing.

8. The gas spring apparatus in accordance with claim 3 or 4 wherein the higher spring force applied to the displacer piston increases its acceleration and the lower spring force decreases its acceleration.

9. The gas spring apparatus in accordance with claim 4 wherein the gas spring piston comprises an annular disk with a thin, downwardly extending, circumferential wall which prevents communication between the larger of the two unequal volume gas spring chambers and the gas reservoir for increasing the maximum force applied to the displacer piston.

10. The gas spring apparatus in accordance with claim 9 wherein the piston further comprises:
    (a) a pressure activated, gas sealing spring formed on the piston for sealing the gas in the smaller chamber from communicating with the gas reservoir and the larger chamber when a larger pressure exists in the small chamber than in the larger chamber and the gas reservoir; and
    (b) a pressure activated, gas sealing spring formed on the thin wall of the gas spring piston for sealing the gas in the larger chamber from communicating with its surroundings.

* * * * *